United States Patent
Vally et al.

(10) Patent No.: US 6,341,890 B1
(45) Date of Patent: Jan. 29, 2002

(54) SENSOR FOR MEASURING TEMPERATURE AND/OR CONCENTRATION

(75) Inventors: Johana Vally, Paris; Olivier Legras, Bourges; Philippe Herve, Paris; Frédéric Peronnet, Bourges; Marc Bernard, St. Florent sur Cher; Eric Collet, St. Doulchard, all of (FR)

(73) Assignee: Auxitrol S.A. (FR)

( * ) Notice: Subject to any disclaimer, the term of this patent is extended or adjusted under 35 U.S.C. 154(b) by 0 days.

(21) Appl. No.: 09/233,675

(22) Filed: Jan. 19, 1999

(30) Foreign Application Priority Data

Jan. 20, 1998 (FR) .............................. 98 00543
Aug. 4, 1998 (FR) .............................. 98 09996

(51) Int. Cl.[7] ........................ G01N 25/00; G01J 5/00; G01K 13/00
(52) U.S. Cl. ........................ 374/45; 374/130; 374/142
(58) Field of Search ................. 374/127, 130, 374/45, 142

(56) References Cited

U.S. PATENT DOCUMENTS

| | | | |
|---|---|---|---|
| 4,576,485 A | * 3/1986 | Lambert | 374/130 |
| 4,744,670 A | * 5/1988 | Janssen | 374/144 |
| 4,780,832 A | * 10/1988 | Shah | 374/130 |
| 4,790,652 A | * 12/1988 | Uneus et al. | 356/315 |
| 5,148,667 A | * 9/1992 | Morey | 431/13 |
| 5,277,496 A | * 1/1994 | Mayer et al. | 374/130 |
| 5,372,426 A | * 12/1994 | Broudy et al. | 374/127 |
| 5,480,298 A | * 1/1996 | Brown | 431/13 |
| 5,551,780 A | * 9/1996 | Wintrich et al. | 374/45 |
| 5,772,323 A | * 6/1998 | Felice | 374/127 |
| 5,797,682 A | * 8/1998 | Kert et al. | 374/127 |

FOREIGN PATENT DOCUMENTS

| | | | |
|---|---|---|---|
| CA | 1075033 | * 4/1980 | ............. 356/417 |
| DE | 4305645 | 8/1994 | |
| EP | 0708317 | 4/1996 | |

OTHER PUBLICATIONS

Hilton et al., "Quantitative analysis of remote gas temperatures and concentrations from their infrared spectra," Meas. Sci. Technol. 6 (Jun. 1995), 1236–1241.*

Epstein et al., "Improvements in repetitive scanning techniques for reducing spectral interferences in flame emission spectrometry,", Spectrochimica Acta, vol. 30B (Apr. 1975), 135–146.*

Patent Abstracts of Japan; vol. 009, No. 290; Nov. 16, 1985 JP 60129524 (Abstract).

* cited by examiner

Primary Examiner—Diego Gutierrez
Assistant Examiner—Stanley J. Pruchnic, Jr.
(74) Attorney, Agent, or Firm—Blakely Sokoloff Taylor & Zafman

(57) ABSTRACT

A sensor used to measure temperature or concentration of a combustible gas. The sensor includes an optical head that picks up infrared information emitted by the combustible gas. The infrared information is conveyed from the optical sensor through a diffracting device onto a strip of photodetectors. A processor receives the information garnered by the photodetectors and determines the concentration and temperature profile of the combustible gas based on a stored thermodynamic model, radiation behavior, varying the thermodynamic parameters, and comparing a calculated spectrum with the measured spectrum. The sensor additionally has elements, such as cooling devices and casing to make it suitable for use with aviation where altitude creates problems with known methods of gas temperature analysis.

41 Claims, 2 Drawing Sheets

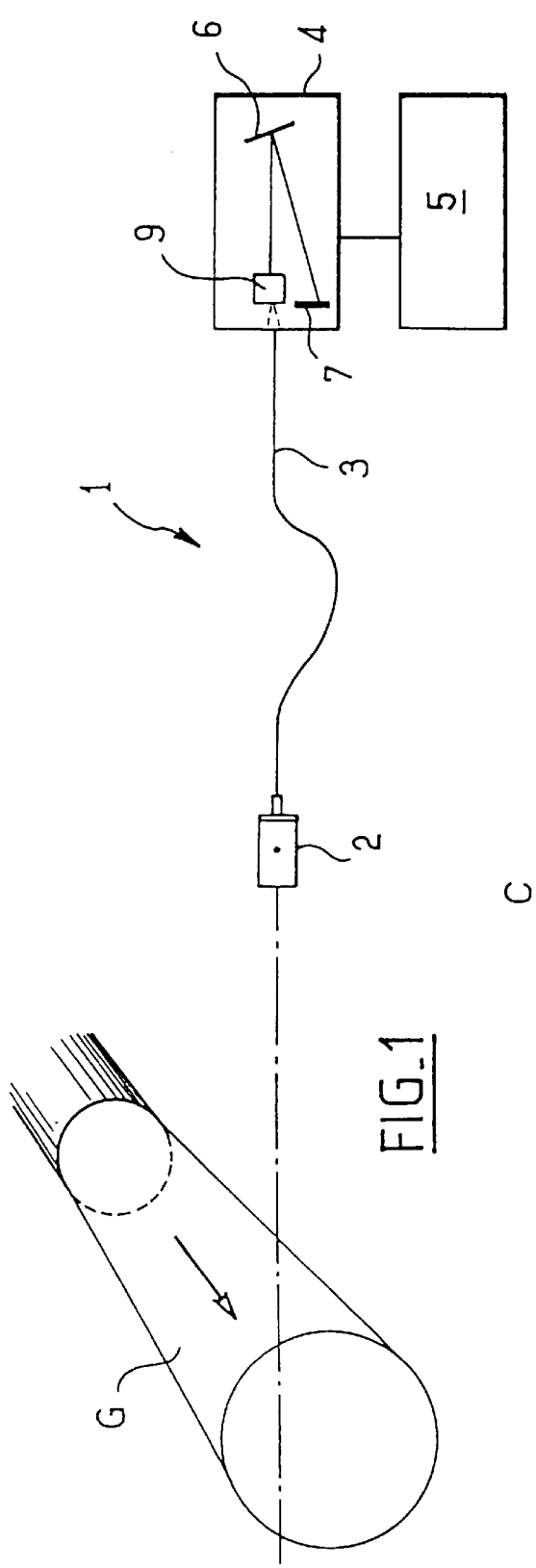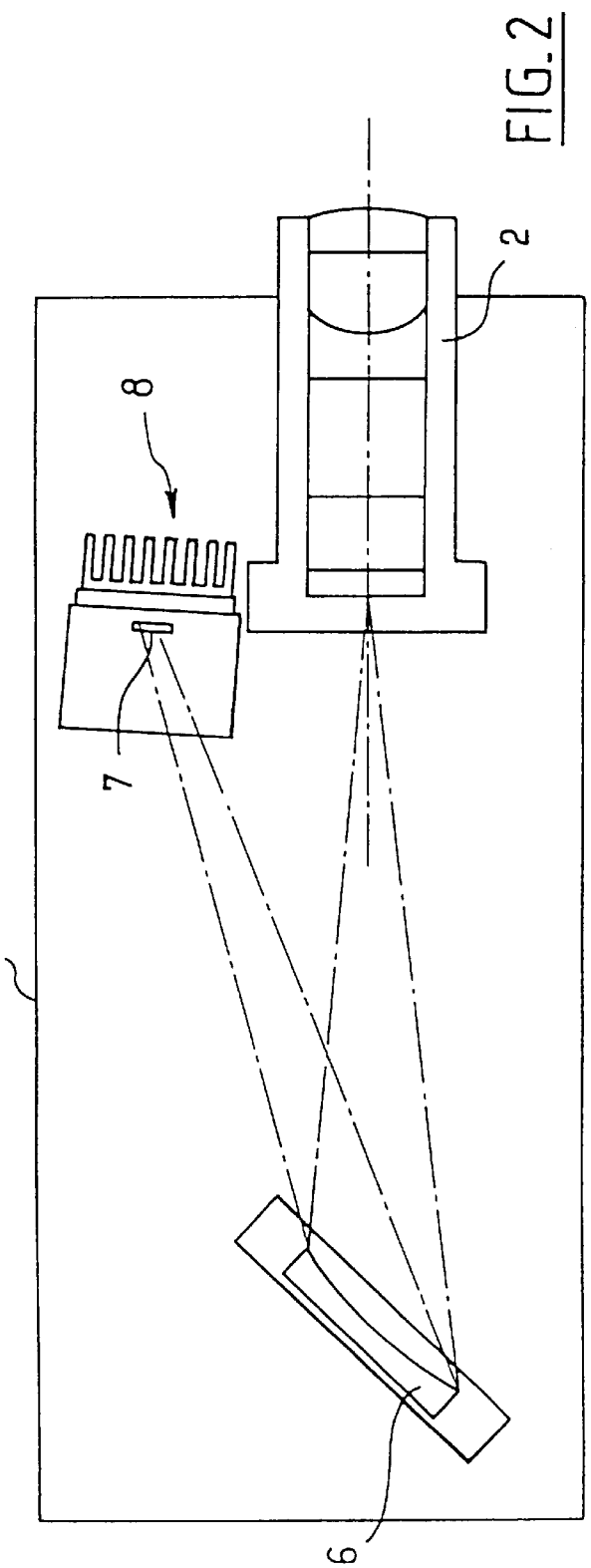

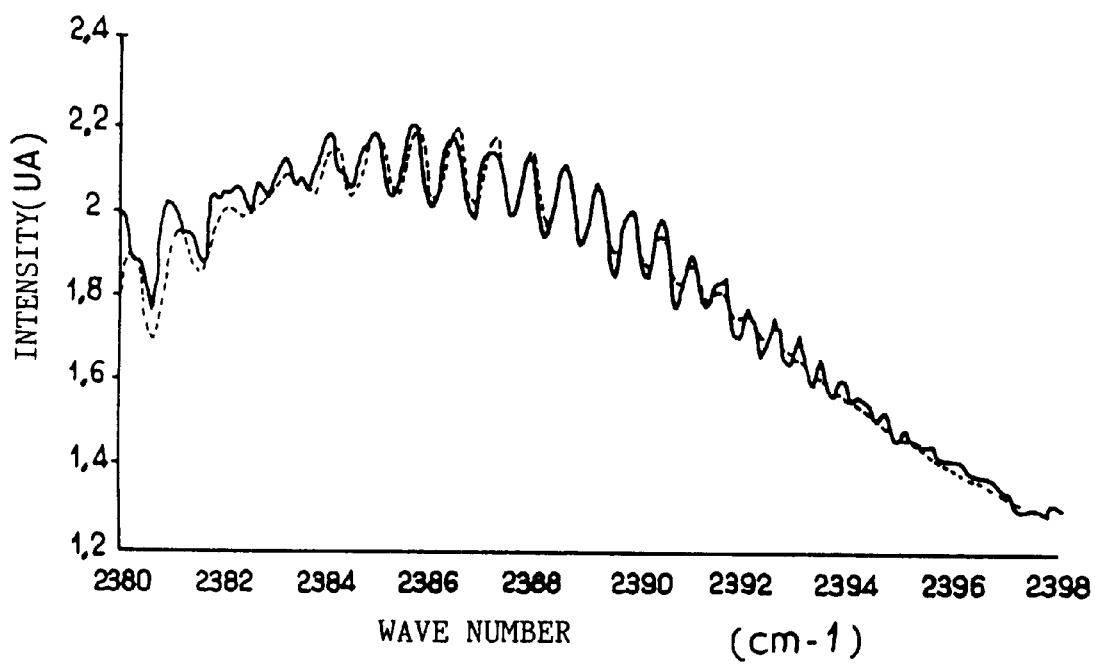
FIG_3a
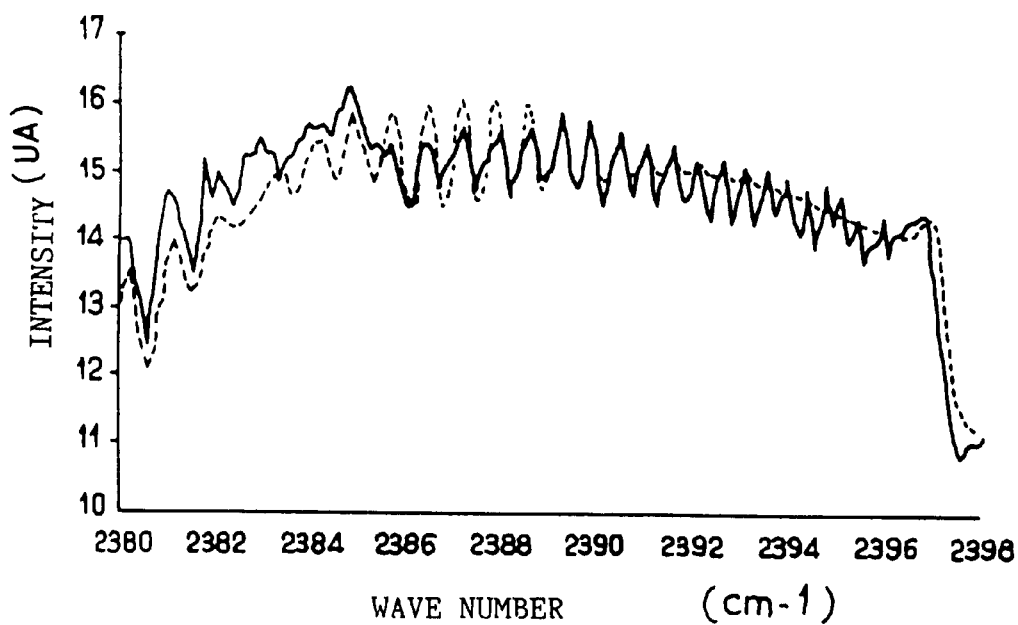
FIG_3b

SENSOR FOR MEASURING TEMPERATURE AND/OR CONCENTRATION

FIELD OF THE INVENTION

The present invention relates to sensors for measuring the temperature and/or the concentration of a gas or of a gaseous free radical.

In particular, the invention finds an advantageous application in the aviation and motor industries as an on-board sensor for measuring temperature and/or concentration, in particular of combustion gases in the field of stationary gas turbines for measuring temperature and/or concentration in combustion chambers.

BACKGROUND OF THE INVENTION

Conventional pyrometry makes use of two principles for measuring temperature. The first principle relies on the convective effect which heats a sensitive element of the thermocouple or resistance probe type. The element is protected inside an envelope that is generally made of metal and that is very sensitive to corrosion at high temperatures. Its lifetime in a flame is very limited. The second principle consists in measuring the black body type radiation emitted by a surface. Radiation varies in application of Planck's function and depends on the emissivity of the material which lies in the range 0 to 1. That method measures only the surface temperature of an object. Those methods do not make it possible to measure directly and reliably the temperature of hot gases in a flame.

An object of the invention is to propose a system which does not present those drawbacks.

It is known that the spectral response of a gas or of a gaseous free radical is a function of its temperature and of its concentration.

However, for reasons of cost and of complexity of implementation, it is not possible to envisage using the spectrometers conventionally found on the market as sensors of the temperature or the concentration of a gas.

It is already known, in particular from DE 43 06 645 (U.S. Pat. No. 5,551,780), to measure the temperature of a combustion flame by means of two photodetectors observing the radiation of the flame in two aiming directions and over a wide band of wavelengths.

Nevertheless, the technique described in DE 43 05 645 is difficult to implement since it assumes that two photodetectors can be placed in two corners of the combustion chamber.

Furthermore, that technique is designed to enable temperature measurement to be performed on the combustion gases of a coal boiler, but does not enable temperature measurements to be collected or flame profiles to be determined with accuracy as high as that which is desirable, for example in the field of aviation.

Also known, from JP 60 129 524, is a device for monitoring the temperature of a flame in which optical sensors are used to measure the intensity of the spectrum which is radiated by a surface which is facing said sensors and which is heated by the flame.

That device does not in any way determine the emission spectrum of the combustion gas and it does not make high accuracy measurement possible.

OBJECTS AND SUMMARY OF THE INVENTION

The invention proposes a sensor for measuring the temperature and/or the concentration of a gas or of a gaseous free radical, the sensor comprising photodetector-forming means and calculation means which determine at least one temperature and/or concentration as a function of measurements performed by said photodetectors, wherein said photodetector means are juxtaposed inside a case in which there are also disposed fixed dispersion means for receiving radiation and for dispersing it as a function of wavelength over said photodetectors which take simultaneous measurements of said radiation, the case also having an optical head enabling radiation emitted by said gas or by said radical to be conveyed to said dispersion means, the combination of dispersion means and of photodetectors making it possible to obtain wavelength resolution of less than 0.1%, the number of photodetectors being not less than three.

Such a sensor constitutes a system which is completely passive, unlike Raman type measurement techniques which excite the gases by means of a laser. The system is therefore not intrusive.

It is very simple and of low cost, while being highly reliable, since it detects and analyses radiation from a gas in a given spectral band by using static means without any moving parts.

It constitutes an assembly which is compact and easy to integrate, in particular on a turbine or a combustion chamber.

The combination of the dispersion means and of the photodetectors enables wavelength resolution of smaller than 0.1% to be obtained, thereby making it possible for each detector to have access to spectral information that is very fine, e.g. around a rotation-vibration transition wavelength of the combustion gas molecule, where the spectrum of the gas is, over a narrow wavelength range, highly sensitive to temperature variations.

For example, when using $CO_2$, the measurements performed by the photodetectors lie in the range 2380 $cm^{-1}$ to 2400 $cm^{-1}$.

In addition, when three or more sensors are available, it is possible to have spectral "curves" which can, for example, be compared with theoretical curves stored in the calculation means. It will be understood that by making a comparison between curves it is possible to obtain much more information than when using only one or two photodetectors measuring the intensity of a spectrum.

Thus, by having a very good model of the spectral region over which the sensor is responsive, and by calculating the radiation budget, the sensor can operate practically in real time (calculation time less than 5 seconds) to produce temperature profiles over about 50 layers of gas, each time comparing the measured spectrum with the calculated spectrum.

Such a sensor can be used to take measurements over very wide ranges of pressure and temperature. It is thus possible to take measurements on hot (350° C.) exhaust gases at atmospheric pressure, all the way to combustion flames which correspond to temperatures of more than 1600° C. and to pressures of 20 bars.

The means for dispersing the radiation on the photodetectors preferably comprise a diffraction grating.

Advantageously, the diffraction grating is shaped to be generally concave, thereby avoiding the need to add concave mirrors for collimation purposes as would be required with a plane diffraction grating.

By using optical fibers that are transparent in the spectral band under analysis, it is possible to offset measurement proper by as much as several tens of meters.

BRIEF DESCRIPTION OF THE DRAWINGS

Other characteristics and advantages of the invention appear further from the following description.

The description is purely illustrative and non-limiting. It should be considered with reference to the accompanying drawings, in which:

FIG. 1 is a diagram showing the principle on which a sensor constituting a possible embodiment of the invention performs a measurement;

FIG. 2 is a diagrammatic section view of the spectrometer-forming means of a sensor constituting a possible embodiment of the invention; and FIGS. 3a and 3b are graphs on which there are plotted the spectral responses as measured and as simulated by a sensor constituting an embodiment of the invention.

MORE DETAILED DESCRIPTION

FIG. 1 shows the principle on which a sensor 1 constituting a possible embodiment of the invention performs a measurement.

In this example, the sensor 1 is constituted by an optical head 2 which picks up the infrared information emitted by hot gases G circulating in a stream, an infrared optical fiber 3 for conveying the optical signal from the optical head 2, means 4 constituting a static spectrometer tuned to the temperature radiation of a molecular species present in the hot gases, and a processor 5 for performing calculations.

The optical head 2 is aimed at the zone in which the hot gases emit infrared radiation under the effect of temperature. In general this is a rotation-vibration band characteristic of the gas molecule whose temperature is to be measured. Most such bands lie in a wavelength range extending from the visible to 10 micrometers ($\mu$m).

The optical head 2 can be constituted by telescope type means, thereby enabling a spectral response to be obtained independently of wavelength. It may also be constituted by a lens made of a material that is adapted to the desired wavelengths (e.g. sapphire).

In either case, a set of diaphragm apertures is advantageously provided to eliminate unwanted secondary lobes.

The infrared optical fiber 3 conveys the radiation as picked up to wavelengths of the order of 4 $\mu$m to 5 $\mu$m. It is inserted in a flexible metal structure for holding it and for protecting it from temperature and vibration. Its length may be as much as about 10 meters, depending on requirements.

Variants in which the sensor does not use such an optical fiber 3 are naturally possible. Under such circumstances, as shown in the setup of FIG. 2, the optical head 2 is mounted directly on the spectrometer-forming means 4.

As also shown in FIG. 2, the means 4 comprise a case C containing a strip of photodetectors 7 and means 6 for dispersing the spectral band that is to be investigated over said strip of photodetectors 7.

A slot 10 is situated on the optical head 2 at the focus of the concave grating and is similar in shape to the strip of photodetectors.

By way of example, the means 6 are constituted by a diffraction grating onto which the radiation coming from the optical fiber 3 is applied, said diffraction grating 6 reflecting the radiation onto the strip of photodetectors 7, dispersing the radiation as a function of wavelength.

To this end, the diffraction grating 6 is preferably shaped to be generally concave, thereby enabling the received radiation energy to be concentrated on said photodetectors 7.

This generally concave shape presents the advantage of avoiding the need to add two collimation mirrors as would be the case when using a plane diffraction grating. By way of example, its focal length is 250 mm, and its diameter is 70 mm.

The photodetectors 7 are spread out relative to the diffraction grating in such a manner as to enable each to measure the intensity of radiation at a different wavelength $\lambda$. Each detector corresponds to a very fine spectral band $\delta\lambda$. The resolution $\delta\lambda/\lambda$ is equal to less than 0.1%, and makes it possible to observe each rotation-vibration spectrum line of the gas or of the free radical. This resolution is preferably equal to or smaller than 0.05%.

The strip of detectors 7 is cooled by one or more Peltier stages 8 so as to achieve its optimum operating temperature.

Also, modulation means 9 (FIG. 1) may be provided on the path of the radiation, e.g. means of the static type having electromechanical or piezoelectric resonance (commonly known as a "chopper"), serving to chop the radiation in such a manner as to make it possible with synchronous filtering to reject the noise that is generated by the detectors. The modulation frequency may be as much as 10 kHz to 20 kHz.

The output signals from the photodetectors 7 are applied to analog/digital inputs of the processor 5. Said processor 5 executes a program based on a thermodynamic model contained in memory and on a radiation balance of the gas to calculate the radiation behavior of a plurality of successive layers of gas on the axis of the optical head 2. By varying the thermodynamic parameters of each layer, and by comparing the calculated spectrum with the spectrum as measured by the photodetector means, the system discovers firstly the concentration in the gas of the molecule which corresponds to the measured spectrum, and secondly the temperature profile of the gas.

By way of example, this inversion is implemented by convergence processing which, for example, can be of the "conjugate gradient regression" type. The processing can also be performed by means of a neural network.

In order to be able to take account of the complexity of the spectral response of the flame, the number of photodetectors is at least five.

By way of example, a strip is used that has 16 or 64 photodetectors 7 of the PbSe type, and the number of photodetectors can be considerably greater than that (up to 100 or even more).

Nevertheless, for spectral responses of relatively simple profile, the number of photodetectors can be quite small. Experience shows that temperature can be determined using a small number of wavelengths only (three or four for a profile that is rectangular).

The graphs of FIGS. 3a and 3b plot as a function of wavelength:

the radiation intensity of the gas as measured by the photodetectors 7 (solid line curve); and the intensity of the radiation from the gas corresponding to a simulation curve as determined by the microprocessor 5 on the basis of the thermodynamic model (dashed line curve).

In both graphs, the gaseous mixture being analyzed contained $CO_2$, as is generally the case for combustion gases.

When analyzing a gas containing $CO_2$, the measurement range is advantageously centered on the rotation-vibration transition of the $CO_2$ molecule lying in the range 2386 $cm^{-1}$ to 2397 $cm^{-1}$.

The graph of FIG. 3a corresponds to $CO_2$ at a concentration of 5.2%, at a total pressure or 2 bars. The temperature calculated by the microprocessor 5 was 778 K, whereas measurement using a thermocouple gave a value of 771 K.

The graph of FIG. 3b corresponds to a $CO_2$ concentration of 10.5%, at a total pressure of 2 bars. The temperature calculated by the processor 5 was 1221 K, while measurement using a thermocouple gave a value of 1421 K.

Consequently, the temperatures measured by the sensor proposed by the invention are very close to measurements obtained by means of a conventional sensor.

As will have been understood, the invention is described above for the case where the gas whose temperature is to be determined is $CO_2$, however the invention applies in like manner to other combustion gases, and in particular to methane whose spectral intensity around 3000 $cm^{-1}$ is large, or indeed to water ($H_2O$).

What is claimed is:

1. A sensor comprising:
    photodetector-forming means and a calculation means which determine at least one of either a temperature or a concentration as a function of simultaneous measurements of a radiation performed by the photodetector-forming means, wherein said photodetector-forming means are juxtaposed inside a case in which there are also disposed a fixed dispersion means for receiving the radiation and for dispersing the radiation as a function of wavelength over the photodetector-forming means, the case also having an optical head enabling the radiation emitted by one of either a gas or a gaseous free radical to be conveyed to the fixed dispersion means, a combination of the fixed dispersion means and of the photodetector-forming means making it possible to obtain wavelength resolution of less than 0.1%, and wherein the photodetector-forming means comprises at least three photodetectors.

2. A sensor according to claim 1, wherein the fixed dispersion means comprises a diffraction grating.

3. A sensor according to claim 2, wherein the diffraction grating is shaped to be generally concave.

4. A sensor according to claim 1, wherein the gas comprises CO2 and the simultaneous measurements lie in the range 2380 $cm^{-1}$ to 2400 $cm^{-1}$.

5. A sensor according to claim 1, further comprising an optical fiber means for conveying the radiation to the optical head.

6. A sensor according to claim 1, including a modulator means disposed on the path of the radiation.

7. A sensor according to claim 1, wherein the optical head is a telescope.

8. A sensor according to claim 1, wherein the optical head includes a sapphire lens.

9. A sensor according to claim 1, wherein the photodetector-forming means comprises at least five photodetectors.

10. A sensor according to claim 1, wherein the calculation means enables one of either a temperature profile or a concentration profile to be determined along an observation axis of the optical head.

11. A sensor according to claim 10, wherein the calculation means include a memory means in which a thermodynamic model of the gas is stored, and wherein the sensor includes a parameters varying means for varying thermodynamic parameters of a plurality of various layers of the gas on the observation axis and for comparing a calculated spectra with a spectra measured by the photodetector-former means.

12. A temperature sensor on board an aircraft, the sensor being constituted by a sensor according to claim 1.

13. A temperature sensor for the combustion chamber of a stationary gas turbine, wherein the temperature sensor is constituted by a sensor according to claim 1.

14. A sensor for measuring the temperature of a gas or of a gaseous free radical,
    the sensor comprising photodetectors,
    said photodetectors being juxtaposed inside a case in which are also disposed a fixed dispersion means for receiving radiation and for dispersing it as a function of wavelength over said photodetectors,
    the case having an optical head with an observation axis enabling radiation emitted by said gas or by said radical to be conveyed to said dispersion means,
    said photodetectors taking simultaneous measurements of said radiation,
    the dispersion means and the photodetectors performing intensity measurements with a wavelength resolution of less than 0.1% in a wavelength range of 2380 $cm^{-1}$ to 2400 $cm^{-1}$, the number of photodetectors being not less than three,
    said sensor also comprising calculation means,
    wherein said calculation means comprise means for computing or storing theoretical curves as a function of temperature profiles over a plurality of layers of said gas or gaseous free radical in the observation axis of the optical head,
    said calculation means also comprising means for computing of storing theoretical curves as a function of temperature profiles over a plurality of layers of said gas or gaseous free radical in the observation axis of the optical head,
    said calculation means also comprising means to compare the measurements performed by said photodetectors and said theoretical curves and to determine through said comparison a temperature profile of said gas or gaseous free radical.

15. A sensor for measuring the temperature of a gas or a gaseous free radical,
    the sensor comprising photodetectors,
    said photodetectors being juxtaposed inside a case in which are also disposed fixed dispersion means for receiving radiation and for dispersing it as a function of wavelength over said photodetectors,
    the case having an optical head with an observation axis enabling radiation emitted by said gas or by said radical to be conveyed to said dispersion means,
    said photodetectors taking simultaneous measurements of said radiation,
    the dispersion means and the photodetectors performing intensity measurements with a wavelength resolution of less than 0.1% in a wavelength range centered on the rotation-vibration transition of a molecule present in the gas,
    the number of photodetectors being not less than three,
    said sensor also comprising calculation means, wherein said calculation means comprise means for computing or storing theoretical curves as a function of temperature profiles over a plurality of layers of said gas or gaseous free radical in the observation axis of the optical head,
    said calculation means also comprising means to compare the measurements performed by said photodetectors and said theoretical curves and to determine through said comparison a temperature profile of said gas or gaseous free radical.

16. A sensor according to claim 15, wherein the dispersion means comprises a diffraction grating.

17. A sensor according to claim 16, wherein the diffraction grating is shaped to be generally concave.

18. A sensor according to claim 15, wherein the gas or gaseous free radical comprises CO2 and the measurements lie in the range 2380 $cm^{-1}$ to 2400 $cm^{-1}$.

19. A sensor according to claim 15, further comprising an optical fiber means for conveying the radiation to the optical head.

20. A sensor according to claim 15, including a modulator means disposed on the path of the radiation.

21. A sensor according to claim 15, wherein the optical head is a telescope.

22. A sensor according to claim 15, wherein the optical head includes a sapphire lens.

23. A sensor according to claim 15, wherein the number of photodetectors is not less than five.

24. A sensor according to claim 15, wherein the calculation means enables one of either a temperature profile or a concentration profile to be determined along the observation axis of the optical head.

25. A sensor according to claim 24, wherein the calculation means include a memory means in which a thermodynamic model of the gas is stored, and wherein the sensor includes a parameters varying means for varying thermodynamic parameters of a plurality of various layers of the gas on the observation axis and for comparing a calculated spectra with a spectra measured by the photodetectors.

26. A temperature sensor on board an aircraft, the sensor being constituted by a sensor according to claim 15.

27. A temperature sensor for the combustion chamber of a stationary gas turbine, wherein the temperature sensor is constituted by a sensor according to claim 15.

28. A sensor comprising:
  an optical head; and
  a case enclosing a processor, a plurality of photodetectors, and a diffraction grating, wherein the optical head receives an emitted radiation and transmits the emitted radiation to the diffraction grating that disperses the emitted radiation, as a function of wavelength, over the plurality of photodetectors, and wherein the processor determines one of either a temperature or a concentration according to a plurality of simultaneously determined measurements of the emitted radiation as a function of wavelength simultaneously received by the plurality of photodectectors.

29. The sensor according to claim 28, wherein the plurality of photodetectors is comprised of at least three photodetectors.

30. The sensor according to claim 28, wherein the diffraction grating is generally concave.

31. The sensor according to claim 28, wherein the emitted radiation is received from a gas comprising CO2 and the plurality of measurements range from 2380 $cm^{-1}$ to 2400 $cm^{-1}$.

32. The sensor according to claim 28, further comprising a length of infrared optical fiber for conveying the emitted radiation form the optical head to the diffraction grating.

33. The sensor according to claim 32, wherein the length of infrared optical fiber is contained in a flexible metal structure.

34. The sensor according to claim 33, wherein the flexible metal structure protects the length of infrared optical fiber from temperatures and vibration.

35. The sensor according to claim 28, wherein the plurality of photodetectors is comprised of at least three photodetectors.

36. The sensor according to claim 28, wherein the optical head comprises a lens made of sapphire.

37. The sensor according to claim 28, wherein the optical head comprises a plurality of diaphragm apertures situated to eliminate undesirable secondary lobes.

38. The sensor according to claim 28, wherein the case further encloses a modulator that intercepts the emitted radiation from the optical head and chops the emitted radiation so as to reject noise generated by the plurality of photodetectors.

39. The sensor according to claim 28, wherein the optical means comprises a slot similar in shape to a shape created by the situation of the plurality of photodetectors.

40. The sensor according to claim 28, further comprising a memory accessible by the processor, wherein the memory stores a thermodynamic model and the processor executes a program, based on the thermodynamic model and on a radiation balance of a gas generating the emitted radiation, that calculates a radiation behavior of a plurality of successive layers of the gas on an axis of the optical head.

41. The sensor according to claim 40, wherein the processor varies thermodynamic parameters of each of the plurality of successive layers, and,
  by comparing a calculated spectrum with the plurality of measurements, discovers one of either the concentration or the temperature of the gas.

* * * * *

UNITED STATES PATENT AND TRADEMARK OFFICE
CERTIFICATE OF CORRECTION

PATENT NO. : 6,341,890 B1
DATED : January 29, 2002
INVENTOR(S) : Vally et al.

It is certified that error appears in the above-identified patent and that said Letters Patent is hereby corrected as shown below:

<u>Title page,</u>
Item [75], Inventors, after "Johana Vally", please delete "Paris" and insert -- Brancas --

Signed and Sealed this

Third Day of August, 2004

JON W. DUDAS
*Acting Director of the United States Patent and Trademark Office*